(12) United States Patent
Fernando et al.

(10) Patent No.: US 7,300,167 B2
(45) Date of Patent: Nov. 27, 2007

(54) ADJUSTABLY OPAQUE WINDOW

(75) Inventors: Primal Fernando, Boulder, CO (US); Noel Clark, Boulder, CO (US); Jiuzhi Xue, Broomfield, CO (US)

(73) Assignee: LCT Enterprises, LLC, Las Vegas, NV (US)

( * ) Notice: Subject to any disclaimer, the term of this patent is extended or adjusted under 35 U.S.C. 154(b) by 0 days.

(21) Appl. No.: 11/298,047

(22) Filed: Dec. 9, 2005

(65) Prior Publication Data

US 2006/0098290 A1    May 11, 2006

Related U.S. Application Data

(63) Continuation-in-part of application No. 10/672,687, filed on Sep. 26, 2003, now abandoned.

(51) Int. Cl.
*G02B 27/28* (2006.01)
(52) U.S. Cl. .................. 359/609; 359/493; 359/601
(58) Field of Classification Search ........ 359/493–495, 359/601, 609
See application file for complete search history.

(56) References Cited

U.S. PATENT DOCUMENTS

| | | | | |
|---|---|---|---|---|
| 5,197,242 A | * | 3/1993 | Baughman et al. | 52/171.3 |
| 5,638,200 A | * | 6/1997 | Xu | 349/117 |
| 6,536,828 B2 | * | 3/2003 | Love et al. | 296/96.19 |
| 2002/0005918 A1 | * | 1/2002 | Kataoka | 349/1 |
| 2003/0013219 A1 | * | 1/2003 | Tungare et al. | 438/27 |

* cited by examiner

*Primary Examiner*—Joshua L Pritchett (57) ABSTRACT

An adjustably opaque window including an external pane, an internal pane, a light transmission control layer and a shock-absorbing layer is provided. The external pane and the internal pane provide a cavity between them, and the light transmission control layer and the shock-absorbing layer are positioned in the cavity. The shock-absorbing layer is a flexible sheet that supports and protects the light transmission control layer. The light transmission layer consists of liquid crystal cells. The transmission ratio of the cells can be controlled variably.

4 Claims, 9 Drawing Sheets

ADJUSTABLY OPAQUE WINDOW

RELATED APPLICATION

This application is a continuation-in-part of U.S. patent application Ser. No. 10/672,687 for "Adjustably Opaque Window" filed on Sep. 26, 2003 now abandoned.

BACKGROUND OF THE INVENTION

The present invention relates to a window having adjustable opacity. More particularly, this invention relates to an adjustable or variable window tinting system for the vehicle and architectural industries, and further, a window system for sunlight protection.

Vehicle and building windows that transmit a fixed fraction of incident light are desired by many, and are currently commercially available to control the sunlight intrusion into vehicles and buildings. Such windows with a fixed tint, while desired by users during bright sunlight days, are undesirable on cloudy days and in the evenings. Windows are needed where a controllable fraction of incident visible light intensity can be applicable under varying environmental as well as social conditions and needs. A protective variable tinting window that controls the visible light transmitting through the window in fractions, and at the same time filter out most of the UV and infrared light is highly desirable.

SUMMARY OF THE INVENTION

The present invention contrives to meet the need for improved variable light-controlling windows and doors.

An objective of the invention is to provide an adjustably opaque window that automatically or manually changes its opacity variably, depending on ambient lighting situations.

Another objective of the invention is to provide an adjustably opaque window that is durable and thin enough to be installed in a vehicle window.

Still another objective of the invention is to filter the UV and infrared light out of vehicles or buildings either by absorption or by reflection.

Still another objective of the invention is to provide an adjustably opaque window that can gradually change its color or tint.

Still another objective of the invention is to provide a robust and dimensionally flexible enclosure for electro-optic materials, such as liquid crystal, for window applications.

To achieve the above objective an adjustably opaque window includes an external pane, an internal pane, an active optical material layer, a plurality of passive optical material layers, and a plurality of shock absorbing layers.

The external pane and the internal pane provide a cavity between them, and the optical material layers and the shock absorbing layers are positioned in the cavity. The optical material layers are sandwiched and supported by the shock absorbing layers.

The shock absorbing layers include first and second shock absorbing layers. The first shock absorbing layer is disposed between the external pane and the light transmission control layer and the second shock absorbing layer is disposed between the internal pane and the light transmission control layer. Alternatively, both of the first and second shock absorbing layers are disposed at the same side of the light transmission control layer.

The active optical material layer includes a light transmission control layer, and the passive optical material layer includes two polarizing layers.

Alternatively, an adjustably opaque window including an external pane, an internal pane, a light transmission control layer, and a plurality of shock absorbing layers are provided. The external pane and the internal pane provide a cavity between them, and the light transmission control layer and the shock absorbing layers are positioned in the cavity. The light transmission control layer is supported by the shock absorbing layers. The attachment among the external pane, the internal pane, the light transmission control layer, and the shock absorbing layers is done with techniques often employed by glass lamination processes, such as those using polyvinyl butyral (PVB), or optically clear UV curable resins such as those under the trade name of Astrocure 1000G, and may further include the use of pressure sensitive adhesive.

The shock absorbing layer includes the lamination materials such as polyvinyl butyral (PVB), UV curable clear resins such as Astrocure 1000G, and or pressure sensitive adhesives that are further designed to have or to enhance their shock absorbing properties while providing the function of attachment among various layers.

Alternatively, the shock absorbing layer includes gel that fills the cavity, and the light transmission control layer is supported in the gel.

Alternatively, the shock absorbing layer includes a first flexible sheet, and the light transmission control layer is attached to the first flexible sheet. The shock absorbing layer may further include a second flexible sheet, and the second flexible sheet is attached to the light transmission control layer opposite to the first flexible sheet.

Preferably, the first and second flexible sheets are made of polyester or polycarbonate, and their thickness should be approximately between 0.1 and 0.2 mm.

The external pane and the internal pane are substantially hard. Preferably, the external pane and the internal pane are made of glass.

In a preferred embodiment, the light transmission control layer includes a plurality of light transmission control cells that are arranged to form a seamlessly tiled lattice structure.

The opacity of the light transmission control cells is variably adjustable. The opacity of each of the light transmission control cells, or of the light transmission control layer, is adjusted by applying an external stimulus such as an external electric field and by changing the amplitude of such an electric field applied to the light transmission control cell.

Each of the light transmission control cells comprises a first electrode, a second electrode, and an electro-optic material in between the first and second electrodes. The electro-optic material may be, and not limited to liquid crystals, nonlinear optical material, and other optical materials having similar characteristics.

The types of liquid crystal which forms the light transmission layer may include but not limited to nematic liquid crystals with or without chiral dopants, chiral nematic liquid crystals, polymeric liquid crystals, ferroelectric liquid crystals. Such liquid crystal may be doped with dichroic light absorbing dye, or with pleochoric light absorbing dye.

The adjustably opaque window further includes a first polarizing layer that is positioned between the external pane and the light transmission control layer, and a second polarizing layer that is positioned between the first flexible sheet and the interior pane. The direction of polarization of the first polarizing layer is substantially perpendicular to the direction of polarization of the second polarizing layer.

The first and second polarizing layers may be integrated with the external and the internal pane, respectively. The first polarizing layer is absorptive, or birefringence based. Also, the first polarizing layer may include wire grids of metals.

In the light transmission cell, the first electrode is substantially adjacent to the first polarizing layer, and the second electrode is substantially adjacent to the first flexible sheet.

The first electrode includes a substantially transparent plastic substrate coated with transparent conductive coating, and the second electrode includes a substantially transparent plastic substrate coated with transparent conductive coating.

The surface of the first electrode, which is adjacent to the liquid crystals, is treated with a first polymer layer such that the first polymer layer gives a preferential alignment to the adjacent liquid crystal. The surface of the second electrode, which is adjacent to the liquid crystal, is treated with a second polymer layer such that the second polymer layer gives a preferential alignment to the adjacent liquid crystal.

The liquid crystals adjacent to the first and second polymer layers are pre-tilted from the planes of the first and second polymer layers. The preferential direction of the treated first polymer layer is substantially parallel to the direction of polarization of the first polarizing layer, and the preferential direction of the treated second polymer layer is substantially parallel to the direction of the second polarization layer.

Preferably, the pre-tilting angle is in a range from 0° to about forty five degrees (45°). More preferably, the pre-tilting angle is about thirty degrees (30°).

The light control transmission cell further includes a plurality of spacers, and the spacers maintain predetermined distance between the first and second electrodes. Part or all of the spacers are coated with adhesive. The spacers are randomly distributed within the light transmission control cell. Each of the spacers includes a sphere, and the sphere contacts the first and second electrodes. The sphere is coated with an adhesive layer. The diameter of the sphere is in a range from about five (5) to about thirty (30) microns, and the thickness of the adhesive layer is less than about five (5) microns.

The first and second flexible sheets are coated with transparent electrically conductive coating, which is made of Indium Tin Oxide (ITO), or another transparent electrically conductive coating. The transparent conductive coating of the first and second flexible sheets is the electrical wiring to each light transmission control cell.

The adjustably opaque window further includes a control circuit that controls each of the light transmission control cells individually, collectively in part, or in whole, with the electrical wiring.

The adjustably opaque window further includes a light sensor that measures the intensity of the incident light, and the control circuit controls the light transmission of the light transmission control cells based on data provided by the light sensor. The light transmission of the light transmission control cells may be controlled manually.

The adjustably opaque window further includes an array of photovoltaic cells, and the array provides electricity for operation of the light transmission control layer via a battery for storage. The adjustably opaque window may be a vehicle window, and the array may be installed in a vehicle. Other applications of the adjustably opaque window include an architectural window, a skylight, a glass door, or a partition.

The adjustably opaque window further includes an ultra violet light blocking layer that is positioned between the exterior pane and the light transmission control layer.

The present invention is summarized in a different aspect below.

A controllable protective tinting window allows the transmission of visible light to be adjusted by external means, while the UV and infrared light are absorbed or reflected out of the vehicle. An important mode of control in tinting applications is the electrical manipulation of optical properties of an active layer.

Figure 1:
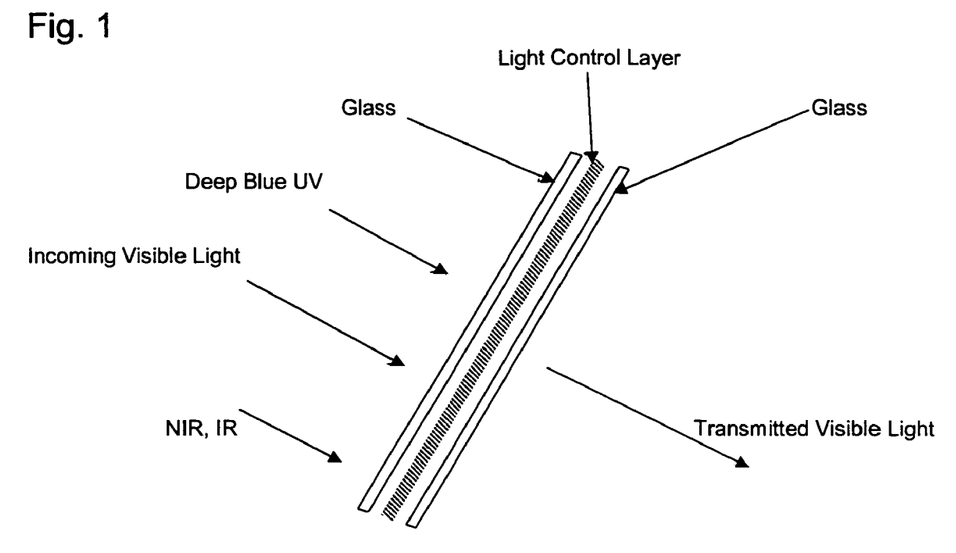
FIG. 1 is a schematic diagram of an adjustably opaque window with its principal functions depicted.
Figure 2:
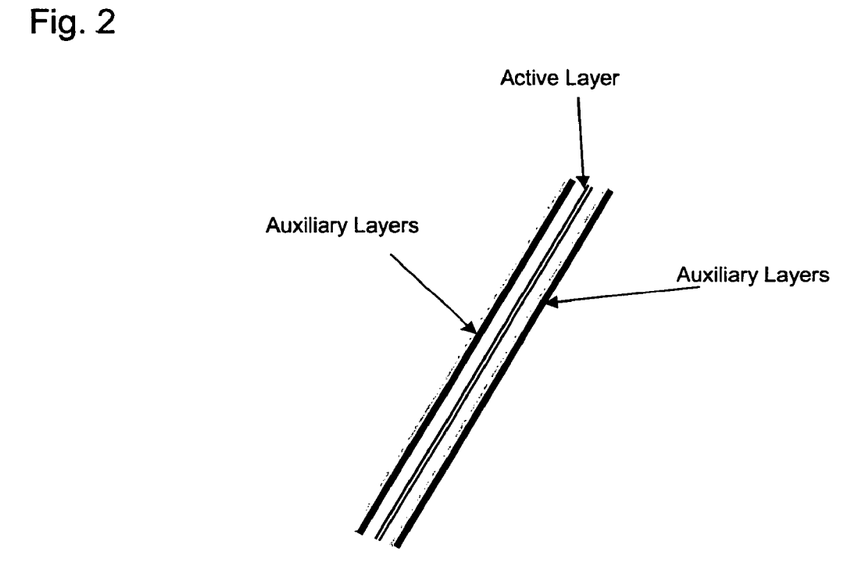
FIG. 2 is an expanded view of the light control layer.

This is the central layer of the light control layer shown in FIG. 1, and with which transmittance of light through the active layer is controlled. An expanded view of the light control layer is shown in FIG. 2. Films of electrically active material such as liquid crystals, and often in combination with auxiliary layers can change the transmittance of light in a way that depends on the external electrical stimulus applied.

Auxiliary layers can be comprised of layers such as polarizers of various types, layers necessary for application of external stimulus such as an electric field, and layers necessary for proper operation of active layers, such as alignment layers and compensation layers to enhance the light attenuation effects for obliquely incident light, when the active layer is liquid crystal.

The unwanted visible light can be reflected, diffracted to the exterior of the vehicle, or absorbed, and/or a combination of all these modes, by the active layer and its auxiliary elements.

The control of visible light transmittance through the light control layer derives from the ability that the optical properties of the active layer can be manipulated using an external stimulus such as an electrical field. Active layers, such as liquid crystals, can change their optical properties such as their birefringence and hence the polarization state of the light traveling through the active layer, when an external stimulus such as an electrical field is applied.

More explicitly, the application of an external stimulus such as an external electrical field to the liquid crystal layer causes liquid crystal molecules, such as those liquid crystals composed of rod-shaped molecules, to reorient. This molecular reorientation in the liquid crystal layer causes a change in the index of refraction of the light traveling through the glass. As a result, there is a change in the polarization of light exiting the liquid crystal layer, due to the application of the external stimulus to the liquid crystal active layer.

Still more explicitly and more generally, the degree of liquid crystal molecular reorientation is dependent on the amplitude of the external stimulus, and the polarization state of light traveling through the liquid crystal layer can be manipulated continuously by manipulating the external stimulus.

Auxiliary layers such as polarizers can then be used to absorb or reflect a fraction of visible light depending on the choice of polarizers and depending on the polarization state of the light, which is controlled by the active layer. Active layers, such as dichroic dye doped liquid crystals can change their absorbance of light upon the application of an external stimulus such as an electrical field, and therefore control the transmittance of light through the active layer using an external stimulus.

The filtering, that is, the reflection or absorption of UV and or infrared light, can be achieved by auxiliary layers, such as an additional UV absorption layer, polarizers, and or other active layers, depending on the choice of such materials. External stimulus applied to the active layer to achieve transmittance change in the visible spectrum will have little or no effects on the filtering of UV and infrared by the light control layer.

Figure 3:
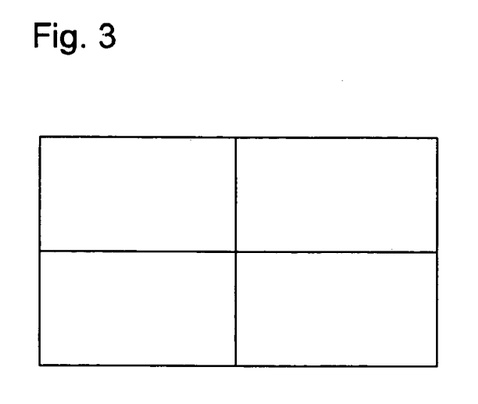
FIG. 3 is a schematic diagram showing a tiling structure of the active layers.

A variety of window sizes are employed in commercial applications and specifically in vehicle, land, marine or air, applications. For large windows, according to the current invention, the active layer is structured such that several smaller active layers joined seamlessly together for a tiled structure and the collection of these smaller tiles, acts as one single active layer that controls the passage of light of the whole panel, as depicted in FIG. 3.

Protective adjustably opaque windows according to the present invention offer a number of advantages.

Natural sunlight radiation has a broad spectrum in the optical frequency regime, ranging from ultraviolet to infrared beams. Ultraviolet (UV) light can induce photochemical reactions, particularly in organic systems, and are harmful to occupants as well as the interior of a vehicle or building. The UV filtering feature provided by the protective adjustably opaque window is an added environmental safety feature to, for example the occupants of a vehicle, and alleviates the problem of use of sunscreen products for the occupants. UV radiation damage to active layers, such as active layers made using liquid crystals, can also be minimized or eliminated by preventing UV from entering the active layers.

The infrared spectrum of sunlight radiation can be absorbed by materials that make up the interior of a vehicle or building, and is a very significant portion of heat converted from absorption of light. According to the present invention, the light control layer can filter out the infrared by reflection or absorption or a combination of both. The filtering of this infrared spectrum can reduce the temperature rise of the interior of a vehicle or building due to this converted heat, and reduce the energy and cost of desired cooling of a vehicle or building on a hot day.

The interval between the inner surfaces of the external and internal panes can be from about one (1) millimeter to about two (2) millimeters.

In another embodiment, an adjustably opaque window includes a) a light transmission control layer, b) first and second electrodes enveloping the light transmission control layer, c) first and second inner shock absorbing layers enveloping light transmission control layer and the electrodes, d) first and second polarizing layers enveloping the light transmission control layer, the electrodes, and the inner shock absorbing layers, e) first and second outer shock absorbing layers, having inner and outer surfaces, enveloping the light transmission control layer, the electrodes, the inner shock absorbing layers, and the polarizing layers, f) an external pane disposed on the outer surface of the first outer shock absorbing layer, and k) an internal pane disposed on the outer surface of the second outer shock absorbing layer.

Each of the electrodes includes a transparent plastic substrate, and are coated by a transparent electrically conductive coating, preferably Indium Tin Oxide, and are treated with a brushed polymer layer.

The adjustably opaque window further includes an ultraviolet light blocking layer and a shock absorbing layer that are positioned between the exterior pane and the light transmission control layer.

The interval between the external and internal panes can vary between one (1) millimeter and two (2) millimeters.

The reduction in thickness of the opaque window is drastic compared to the prior art considering that it has a plurality of shock absorbing layers and other structures, which is definitely not obvious to the LCD industry.

The primary function, and thus the advantage of the adjustably opaque window is that it reduces the transmission of unwanted light when the light setting is too bright, and it can be tuned for maximum transmission in a darker light setting. An additional advantage of the use of the protective adjustably opaque window is that they can provide privacy under a wide range of natural lighting conditions. Thus objects on the dimmer interior side of the window will be obscured to observers on the brighter side by the reflected exterior light. Privacy can be further enhanced by controlling the tint, to reduce the transmission of light through the window.

Furthermore, the tiled structure of the active layer for large windows is advantageous in several ways. The yield, and thus the associated costs, of active layers is typically a nonlinear function of its area size. For example, the cost of a semiconductor IC chip grows exponentially as a function of the area, due to unavoidable contaminations and defects. Smaller active layers have much higher yield ratios and the material costs will be lower. In addition, many supply materials and tools necessary to make the active layers may not be able to handle large sizes even if it is chosen to do so. The overall handling of smaller but very thin active layers can be easier compared to handling the larger ones. Thus the cost is cheaper and the windows are easier to manufacture. In the larger size windows, the active layer is a collection of seamlessly tiled smaller pieces of active layers. Due to a higher yield in the smaller tiles, the tooling is readily available, and it is easier to handle.

Although the present invention is briefly summarized, the fuller understanding of the invention can be obtained by the following drawings, detailed description and appended claims.

DESCRIPTION OF THE FIGURES

These and other features, aspects and advantages of the present invention will become better understood with reference to the accompanying drawings, wherein.

DETAILED DESCRIPTION OF THE INVENTION

The control of visible light transmittance through the light transmission control layer derives from the ability that the optical properties of an active layer, which is the central layer of the light transmission control layer, can be manipulated using an external stimulus such as an electrical field. Active layers, such as liquid crystals, can change their optical properties such as their birefringence and hence the polarization state of the light traveling through the active layer, when an external stimulus such as an electrical field is applied.

More explicitly, the application of an external stimulus such as an external electrical field to the liquid crystal layer causes liquid crystal molecules, such as those liquid crystals composed of rod-shaped molecules, to reorient. This molecular reorientation in the liquid crystal layer causes a change in the index of refraction of the light traveling through the glass. As a result, there is a change in the polarization of light exiting the liquid crystal layer, due to the application of the external stimulus to the liquid crystal active layer.

Still more explicitly and more generally, the degree of liquid crystal molecular reorientation is dependent on the amplitude of the external stimulus, and the polarization state of light traveling through the liquid crystal layer can be manipulated continuously by manipulating the external stimulus.

Auxiliary layers such as polarizers can then be used to absorb or reflect a fraction of visible light depending on the choice of polarizers and depending on the polarization state of the light, which is controlled by the active layer. Active layers, such as dichroic dye doped liquid crystals can change their absorbance of light upon the application of an external stimulus such as an electrical field, and therefore control the transmittance of light through the active layer using an external stimulus.

The filtering, that is, the reflection or absorption of UV and or infrared light, can be achieved by auxiliary layers, such as an additional UV absorption layer, polarizers, and or other active layers, depending on the choice of such materials. External stimulus applied to the active layer to achieve transmittance change in the visible spectrum will have little or no effects on the filtering of UV and infrared by the light control layer.

A variety of window sizes are employed in commercial applications and specifically in vehicle, land, marine or air, applications. For large windows, according to the current invention, the active layer is structured such that several smaller active layers joined seamlessly together for a tiled structure and the collection of these smaller tiles, acts as one single active layer that controls the passage of light of the whole panel, as depicted in FIG. 3.

The light control layer, comprising an active layer, can assume a variety of layered structures with varying layer thickness and layer structures. A variety of electrooptic materials can be used as the active layers. Such layers can be made up of liquid crystals, polymer liquid crystals, or other optical materials such as nonlinear optical materials.

In one of the preferred embodiments, the active layer is comprised of a liquid crystal layer, which is bounded by substrates such as a pair of non-intersecting glass or flexible polymer substrates like polyester or polycarbonate films. The substrates are generally further comprised of transparent conductive layers, through which external stimulus such as electricity can be applied to liquid crystals, and other overcoats such as polymer or inorganic thin layers for various purposes including alignment of liquid crystals, prevention of electrically shorting the two substrates, and prevention of penetration of moisture to the active liquid crystal layers. The substrates may further be doped with metallic materials such as silver or conducting polymers such as polyaniline to increase the electrical conductivity of the substrates. The liquid crystal layer is bounded by a pair of polarizers, with their polarization selection direction nominally at 0 or 90 degrees to each other.

In this preferred embodiment of using liquid crystal as an active layer, the liquid crystals can be nematic, with or without chiral dopants, or the liquid crystal active layer can be a layer of chiral nematic liquid crystals. Further, the liquid crystal active layer can be other forms of liquid crystals such as polymeric liquid crystals or ferroelectric liquid crystals. Further, the liquid crystal layer may be doped with dichroic or pleochroic light absorbing dyes. Addition of such dyes can assist with needed transmission control for the variable tinting applications.

Still in this preferred embodiment, the polarizers can be reflective in nature, where the reflective polarizers can be birefringence based or wire grids of metals which further can reflect infrared light and at least partially block the UV light. Further, the polarizers can be absorptive in nature, where the selection of polarization is achieved by absorbing light in the unwanted polarization direction by the polarizing film.

In another preferred embodiment of using liquid crystal as the active layer, the liquid crystals can be nematic doped with dichroic or pleochroic light absorbing dyes, and the dielectric anisotropy is negative. In this preferred embodiment, no polarizers may be necessary to achieve tinting control.

In another preferred embodiment, the light control layer, in addition to the active layer such as liquid crystal layer discussed above, is comprised of a UV layer and a IR filtering layer with proper filtering functions laminated to the window glass or the active layer assembly.

In one preferred embodiment, the protective variable tinting window can be fabricated by first making the light control layer and then laminated in between two panes of window glasses, using such adhesive layers such as pressure sensitive adhesive layers. Yet in another embodiment, the light control layer can be laminated onto the inner side of a window glass in a way similar to the lamination of a fixed sheet window tint material. The adhesive material can again be such material as pressure sensitive adhesive films.

Still in another preferred embodiment, smaller light control layer or active layers are arranged in two rolls or two columns so that the active layers can be tiled seamlessly in the interior of the window while the means of applying external stimulus can be conveniently hidden along the edges of the window.

Still in another preferred embodiment, the external stimulus can be an electric stimulus, which can be an oscillatory electrical field from a circuitry that is powered by the battery system of the vehicle. Alternatively, the circuitry may be powered by solar cells that are laminated on the top section of the windshield glass.

The present invention is further explained with reference to FIGS. 4-18.

In an embodiment, an adjustably opaque window includes an external pane, an internal pane, an active optical material layer, a plurality of passive optical material layers, and a plurality of shock absorbing layers.

The external pane and the internal pane provide a cavity between them, and the optical material layers and the shock absorbing layers are positioned in the cavity. The optical material layers are sandwiched and supported by the shock absorbing layers.

The shock absorbing layers include first and second shock absorbing layers. The first shock absorbing layer is disposed between the external pane and the light transmission control layer and the second shock absorbing layer is disposed between the internal pane and the light transmission control layer. Alternatively, both of the first and second shock absorbing layers are disposed at the same side of the light transmission control layer.

The active optical material layer includes a light transmission control layer, and the passive optical material layer includes a polarizing layer.

Figure 4:
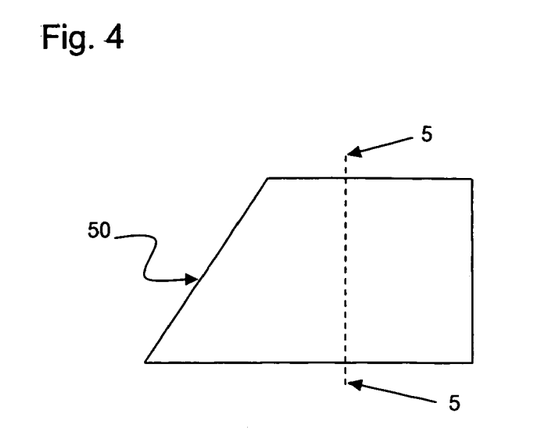
FIG. 4 is an elevation view showing an adjustably opaque window according to the present invention.
Figure 5:
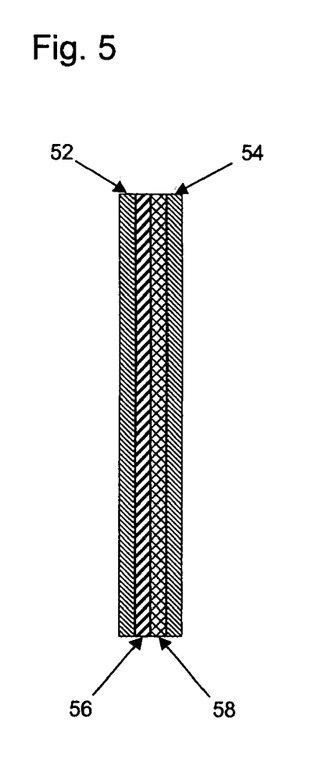
FIG. 5 is a partial cross-sectional view of the window taken along the line 5-5 of FIG. 4.

FIGS. 4 and 5 show an adjustably opaque window 50 according to the present invention. The window 50 includes an external pane 52, an internal pane 54, a light transmission control layer 56, and a shock absorbing layer 58. The light transmission control layer 56 is supported by the shock absorbing layer 58. For the effectiveness of illustration, the elements are not drawn to scale throughout the drawings. Attachment among the external pane 52, the internal pane 54, the light transmission control layer 56, and the shock absorbing layer 58 is done with pressure sensitive adhesive.

Figure 6:
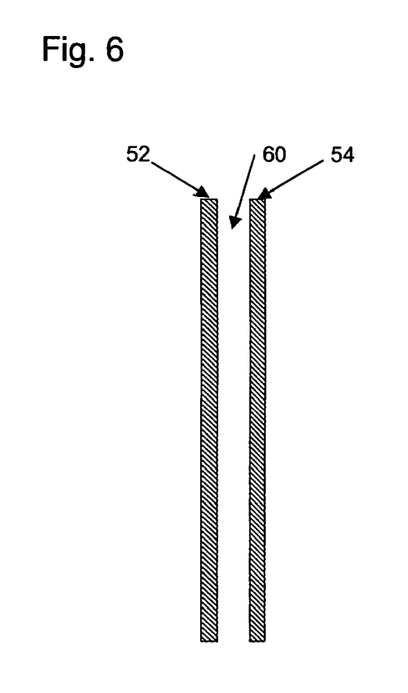
FIG. 6 is a view similar to FIG. 5 showing a cavity between internal and external panes.

FIG. 6 shows that the external pane 52 and the internal pane 54 provide a cavity 60 between them. The light transmission control layer 56 and the shock absorbing layer 58 are positioned in the cavity 60 as shown in FIG. 5.

Figure 7:
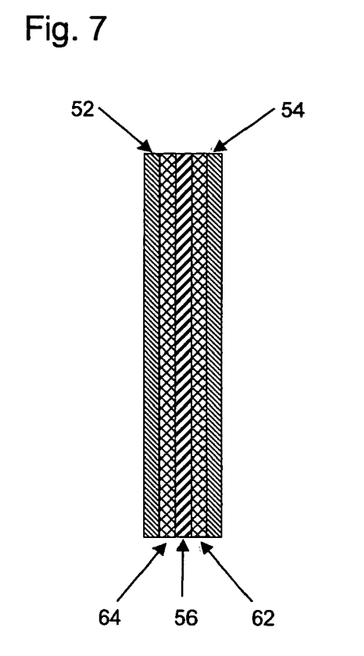
FIG. 7 is a view similar to FIG. 5 showing a shock absorbing layer.

FIG. 7 shows that the shock absorbing layer 58 comprises a first flexible sheet 62, and an optional second flexible sheet 64. The light transmission control layer 56 is attached to the first flexible sheet 62. The second flexible sheet 64 is attached to the light transmission control layer 56 opposite to the first flexible sheet 62. Moreover, a plurality of flexible sheets may be added on the either side of the light transmission control layer to strengthen and toughen the window. Preferably, the material for the flexible sheets 62, 64 is polyester or polycarbonate, and the thickness of the flexible sheets is in a range from about 0.1 to about 0.2 mm. The first flexible sheet 62 protects the light transmission control layer 56, which may include a fragile material including liquid crystal, from external shock.

Preferably, the external pane 52 and the internal pane 54 are substantially hard to provide structural rigidity required for various applications. For example, the panes 52, 54 are made of glass or plastic. Other light transmitting panes are also acceptable.

Figure 8:
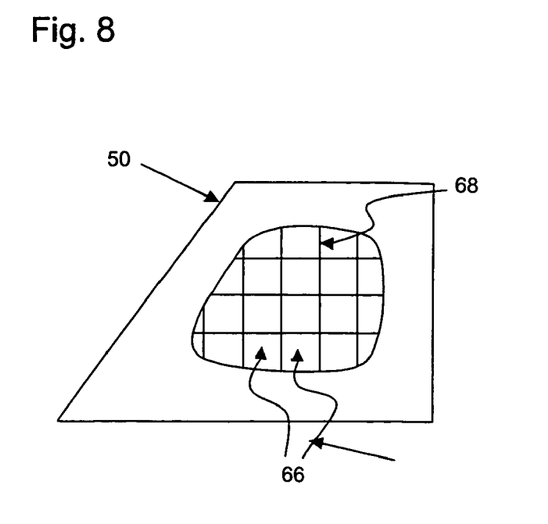
FIG. 8 is an elevation view of the window showing a lattice of light transmission control cells.

FIG. 8 shows that the light transmission control layer 56 includes a plurality of light transmission control cells 66. The light transmission control cells 66 are arranged to form a lattice 68. Although a lesser number of the light transmission control cells 66 may be used when larger cells are used, it is preferable to use smaller light transmission control cells 66 to provide more redundancy and flexibility. The opacity of the light transmission control cell 66 is variably adjustable by changing amplitude of electric field applied on the light transmission control cell 66. Tiling the window 50 with the light transmission control cells 66 makes manufacturing of the window 50 substantially easier.

Figure 9:
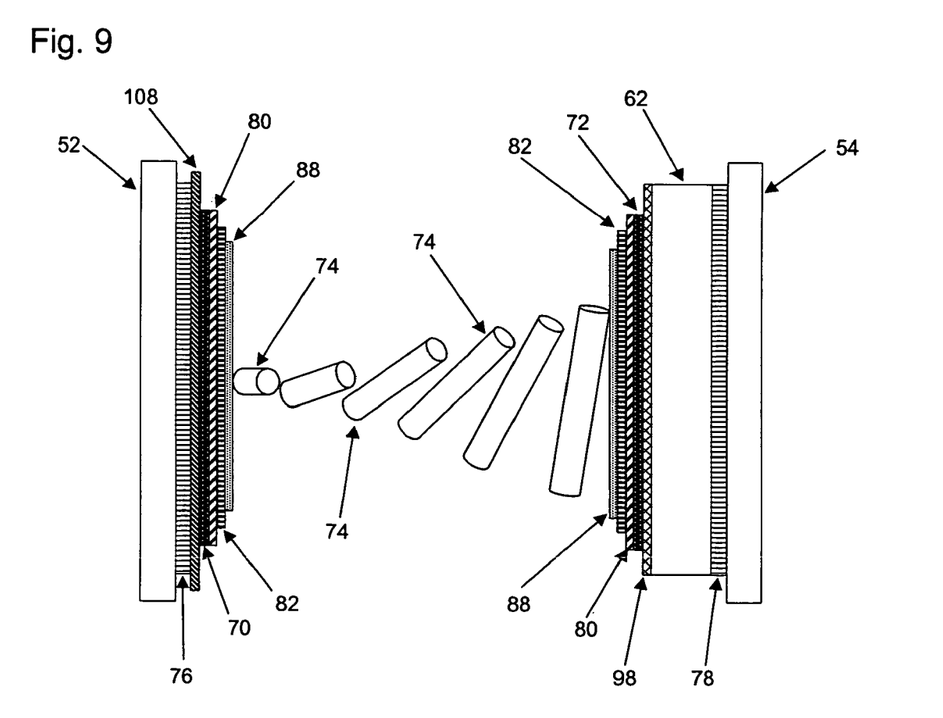
FIG. 9 is a cross-sectional view of the light transmission control cell within the window.

FIG. 9 shows that the light transmission control cell includes a first electrode 70, a second electrode 72, and an electro-optic material 73 in between the first and second electrodes 70, 72.

The electro-optic material 73 includes liquid crystal 74, or nonlinear optical material. The liquid crystal includes dichroic dye doped liquid crystals, nematic liquid crystals with or without chiral dopants, chiral nematic liquid crystals, polymeric liquid crystals, and ferroelectric liquid crystals. The liquid crystal may be doped with dichroic light absorbing dye, or pleochoric light absorbing dye.

More general description of liquid crystal used in light transmission control is given in U.S. Pat. No. 5,197,242, the disclosure of which is incorporated by reference into this application.

The window 50 further includes a first polarizing layer 76 that is positioned between the external pane 52 and the light transmission control layer 56, and a second polarizing layer 78 that is positioned between the first flexible sheet 62 and the interior pane 54.

The direction of polarization of the first polarizing layer 76 is substantially perpendicular to the direction of polarization of the second polarizing layer 78.

The first polarizing layer 76 and the second polarizing layer 78 may be integrated with, within, as a part of, or alongside the external pane 52 and internal pane 54, respectively.

The first polarizing layer 76, which receives the incident light from outside, may be absorptive, birefringence based, or include wire grids of metals for better filtering effect against unwanted lights.

In the light transmission control cell 66, the first electrode 70 is substantially adjacent the first polarizing layer 76, and the second electrode 72 is substantially adjacent the first flexible sheet 62. The liquid crystal 74 is positioned between the first electrode 70 and the second electrode 72.

The first electrode 70 includes a substantially transparent plastic substrate 80 coated with transparent conductive coating 82, and the second electrode 7 2 includes a substantially transparent substrate plate 80 coated with transparent conductive coating 82.

The surface of the first electrode 70, which is adjacent the liquid crystal 74, is treated with a first polymer layer 86 such that the first polymer layer 86 gives a preferential alignment to the adjacent liquid crystal 74. The surface of the second electrode 72, which is adjacent the liquid crystal 74, is treated with a second polymer layer 88 such that the second polymer layer 88 gives a preferential alignment to the adjacent liquid crystal.

Preferential alignment means that the liquid crystal molecules that are adjacent the polymer layers 86, 88 tend to orient with their long axes parallel to the direction to which the polymer layers 86, 88 are rubbed or brushed. The brushed direction of the first polymer layer 86 is substantially perpendicular to the brushed direction of the second polymer layer 88.

The preferential direction of the treated first polymer layer 86 should be substantially parallel to the direction of polarization of the first polarizing layer 76, and the preferential direction of the treated second polymer layer 88 should be substantially parallel to the direction of the second polarizing layer 78.

The liquid crystals 74 adjacent the first and second polymer layers 86, 88 are pre-tilted from the planes of the first and second polymer layers 86, 88. That is, in FIG. 9, the rod-like liquid crystals 74 make an angle with the first and second polymer layers 86, 88.

This pre-tilting of the liquid crystals adjacent the treated polymer layers facilitates the variable control of the alignment of the liquid crystals 74, and thus the variable control of the opacity of the light transmission control cell 66. A zero or small angle pre-tilt of liquid crystals adjacent to the places of polymer layers typically result in a device where a small change in externally applied stimulus such as an external electric field will cause a significant change in light transmission. A higher pre-tilt, in particular, a pre-tilt that is about 30° or more, will result in a light transmission control device whose light transmittance will changes smoothly when the external stimulus is changed.

Preferably, the pre-tilting angle is in a range from 0° to about forty-five degrees (45°). More preferably, the pre-tilting angle is about thirty degrees (30°).

Figure 10:
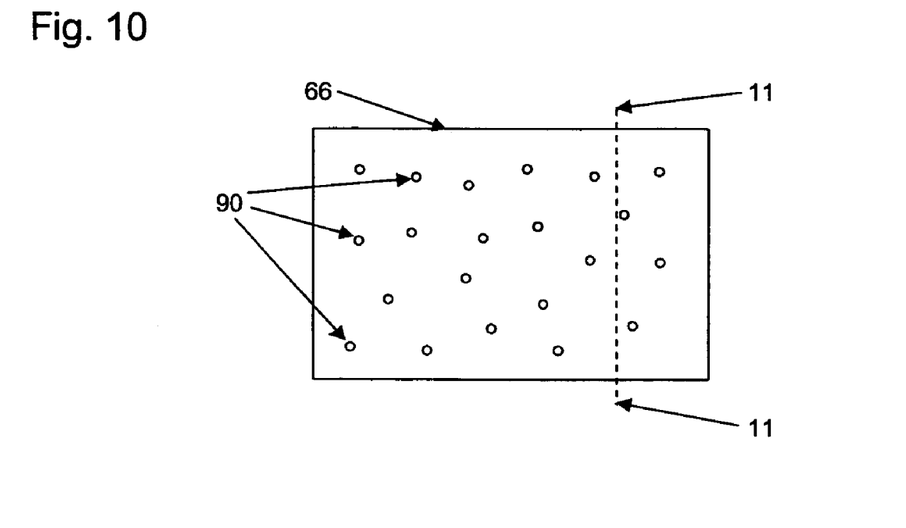
FIG. 10 is a plan view of spacers in the light transmission control cell.

FIG. 10 shows that the light control transmission cell 66 further includes a plurality of spacers 90. The spacers 90 are coated with adhesive. The spacers 90 may be randomly or uniformly distributed within the light transmission control cell 66.

Figure 11:
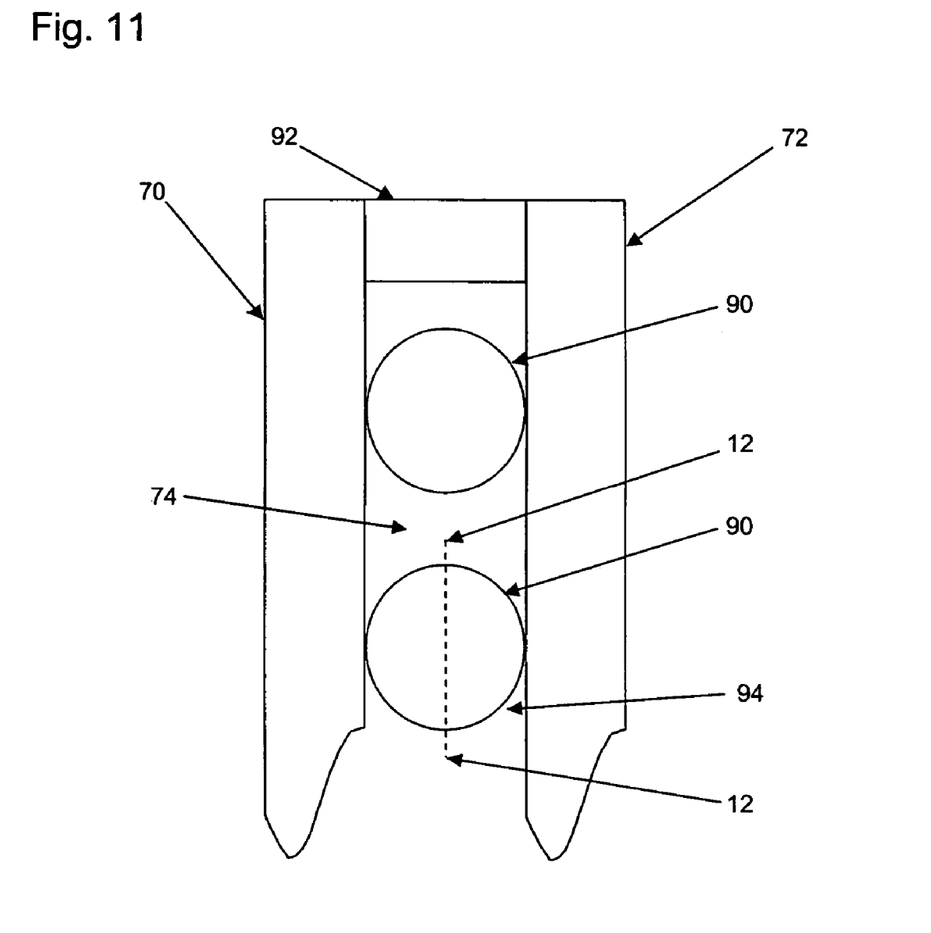
FIG. 11 is a partial cross-sectional view taken along the line 11-11 of FIG. 10.

As shown in FIG. 11, the spacers 90 contact the first and second electrodes 70, 72 and maintain predetermined distance between the first and second electrodes 70, 72. The boundaries of the light transmission control cell 66 are sealed by adhesive 92.

Figure 12:
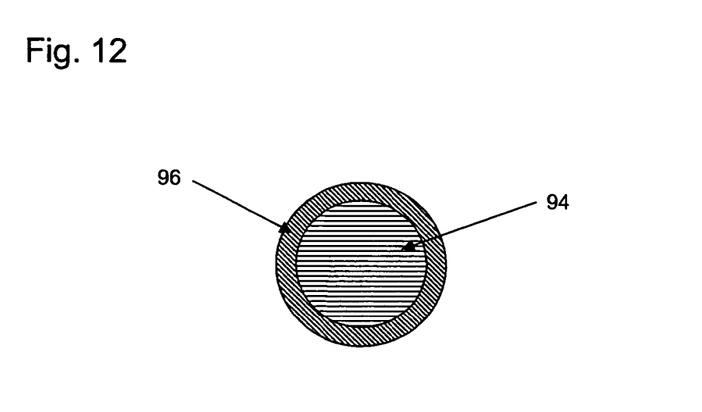
FIG. 12 is a cross-sectional view taken along the line 12-12 of FIG. 11.

As shown in FIG. 12, the cross-section of the spacer 90 includes a sphere 94, and the sphere 94 is coated with an adhesive layer 96. The diameter of the sphere 94 should be in a range from about five (5) to about thirty (30) microns, and the thickness of the adhesive layer 96 is less than about five (5) microns. The spacer 90 having the adhesive layer 96 effectively maintains the distance between the first and second electrodes 70, 72, and protects the liquid crystal 74 against external force, so that the cell 66, and thus the window 50 may be curved, bent or flexed. More particularly, since the first and second electrodes 70, 72 of the light transmission control cell 66 are supported at multiple points, at which the randomly distributed spacers 94 are positioned, even though the cell 66 as a whole is bent, the distance between the first and second electrodes 70, 72, and hence the thickness of the cell 66 is kept constant throughout the cell 66, thereby protecting the cell 66 and the liquid crystal 74 inside.

Referring back to FIG. 9, the first flexible sheet 62 is coated with transparent electrically conductive coating 98. Preferably, the transparent conductive coating 98 is made of Indium Tin Oxide. The transparent conductive coating 98 forms an electrical wiring 102 (refer to FIG. 13) to each light transmission control cell 66.

Figure 13:
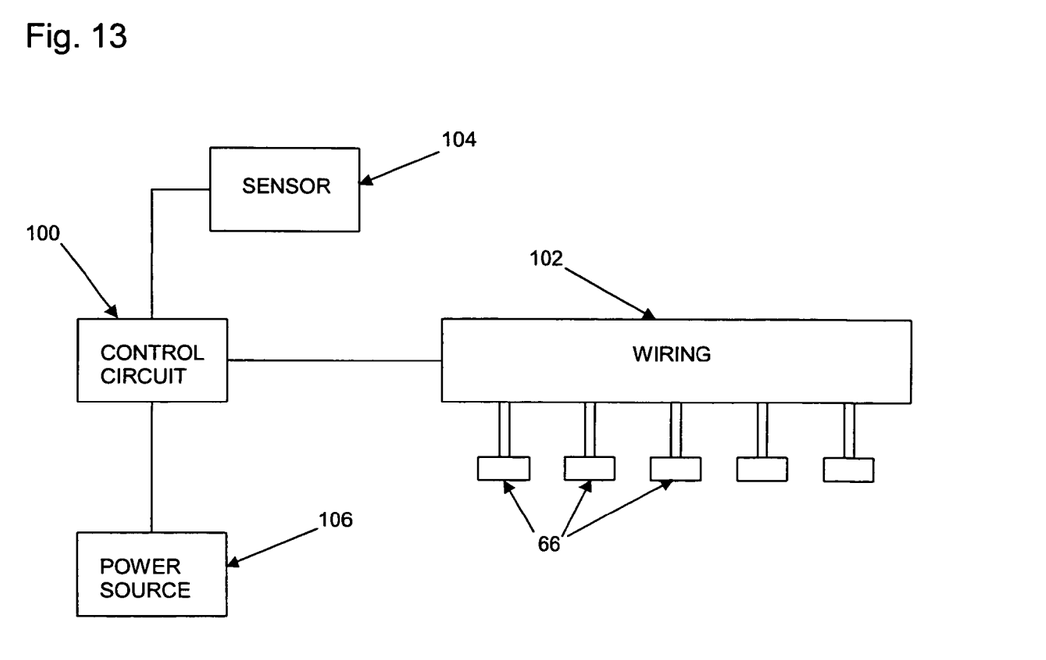
FIG. 13 is a schematic circuit diagram that shows controlling of the light transmission control cells.

FIG. 13 schematically shows how the light transmission control cells 66 are controlled. The adjustably opaque window 50 further includes a control circuit 100 that controls each of the light transmission control cells 66 individually with the electrical wiring 102. The control circuit 100 may also control the light transmission control cells 66 collectively in part or in whole depending on the requirements on the window 50 such as blocking most of the incident light, partial or gradual tinting of the window, or displaying specific images on the window.

The adjustably opaque window 50 may further include a light sensor 104 that measures the intensity of the incident light. The control circuit 100 controls the light transmission, or the opacity of the light transmission control cells 66, and thus of the light transmission control layer 56, based on data provided by the light sensor 104. On the other hand, the control of the light transmission control cells 66 may be overridden manually.

The adjustably opaque window further includes a power source 106 for supplying power to operate the light transmission control layer 56. In one application, the window 50 may be a vehicle window, and the power source 106 may be an array of photovoltaic cells (not shown) installed on a vehicle such as the upper portion of the windshield glass to harness and collect the sunlight, or may be simply the battery used in the vehicle.

In other applications, the adjustably opaque window 50 is an architectural window, a glass door, a partition, a mirror, a sun roof, a moon roof, or anywhere windows are used.

Referring back to FIG. 9, the adjustably opaque window 50 further includes an ultra violet light blocking layer 108 that is positioned between the exterior pane 52 and the light transmission control layer 56.

Figure 14:
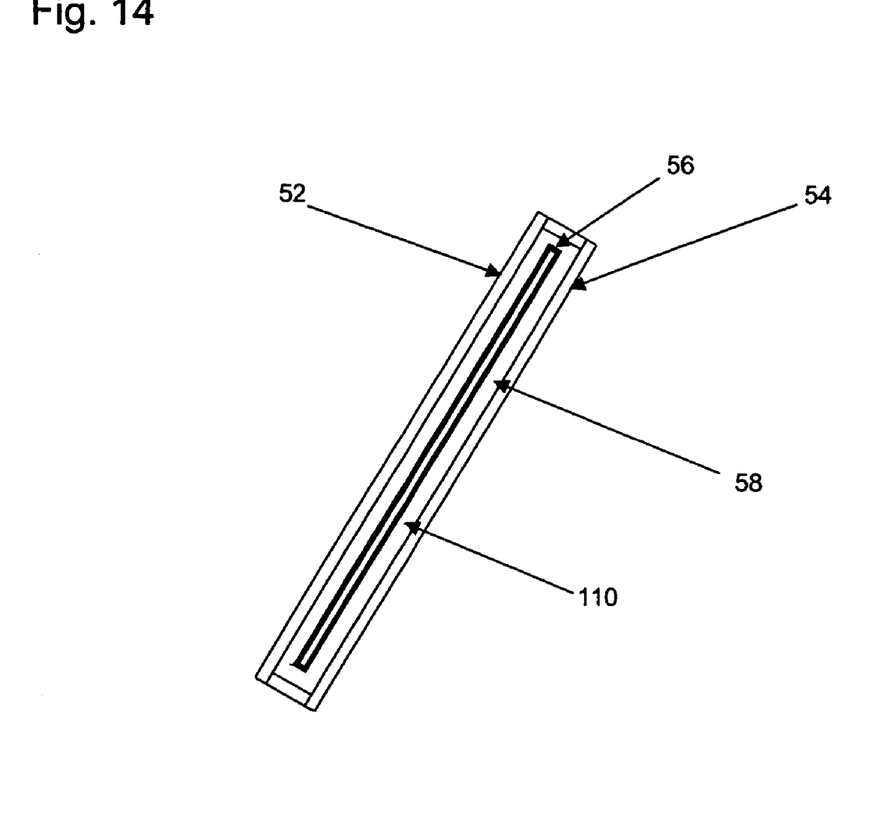
FIG. 14 is a view similar to FIG. 7 showing that the shock absorbing layer includes gel.

FIG. 14 shows another embodiment of the shock absorbing layer 58. The shock absorbing layer 58 includes gel 110 filled in the cavity 60, and the light transmission control layer 56 is supported in the gel 110.

The light transmission control cells and their arrangement are such that the said window seem seamless to human eyes. Also, the spacers within the light transmission control cells are microscopic in size and are not visible to human eye.

Figure 15:
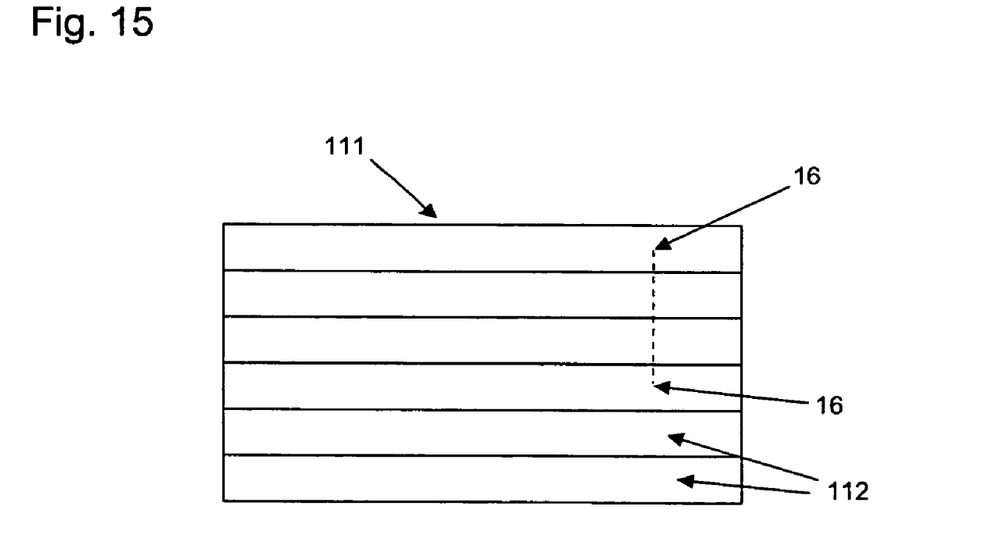
FIG. 15 is an elevation view of the window showing a different partition with the cells.
Figure 16:
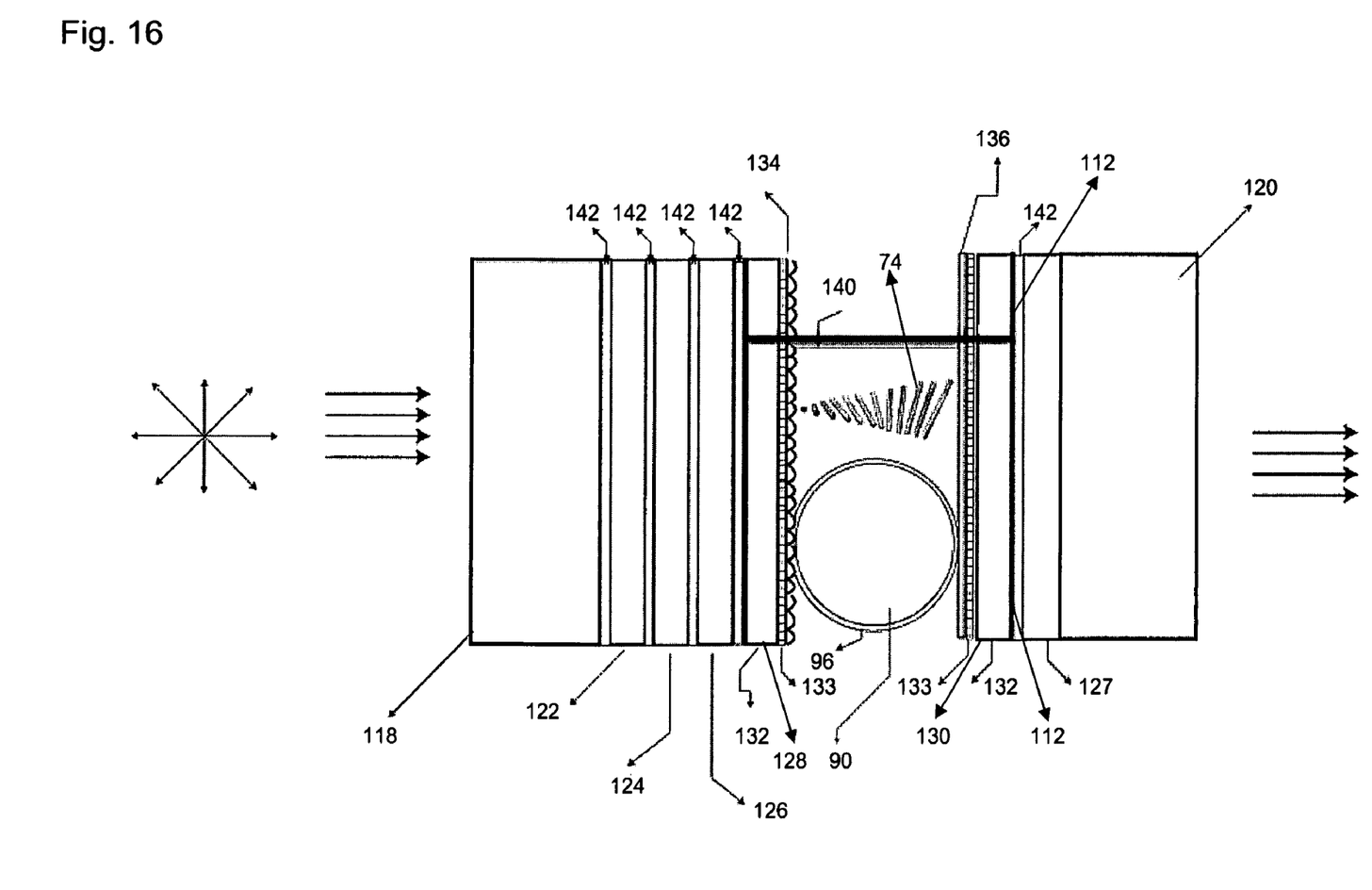
FIG. 16 is a partial cross-sectional view taken along the line 16-16 of FIG. 15.
Figure 17:
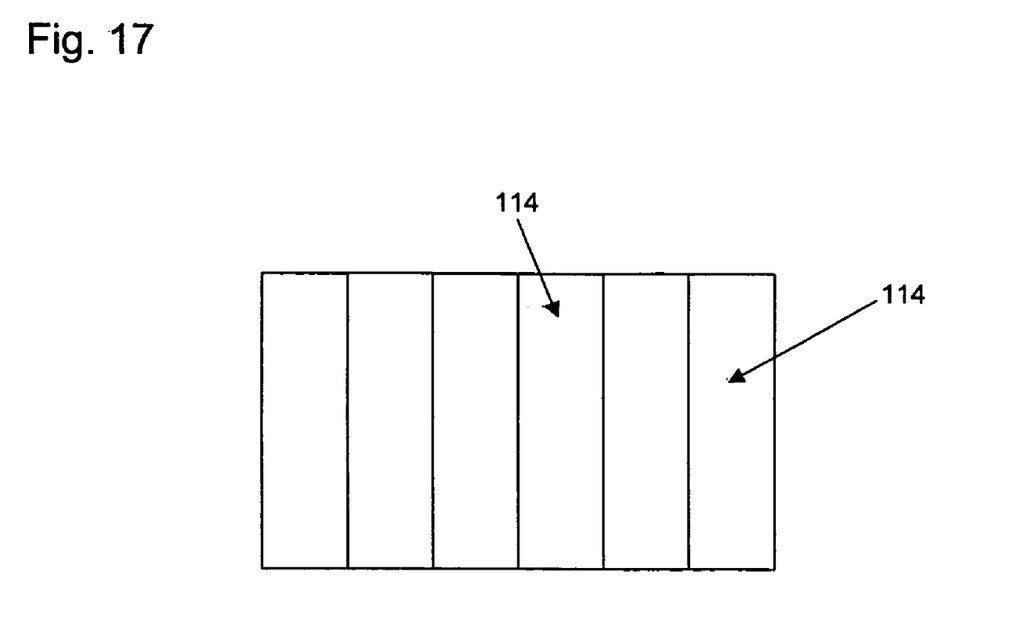
FIG. 17 is an elevation view of the window showing a different partition with the cells.
Figure 18:
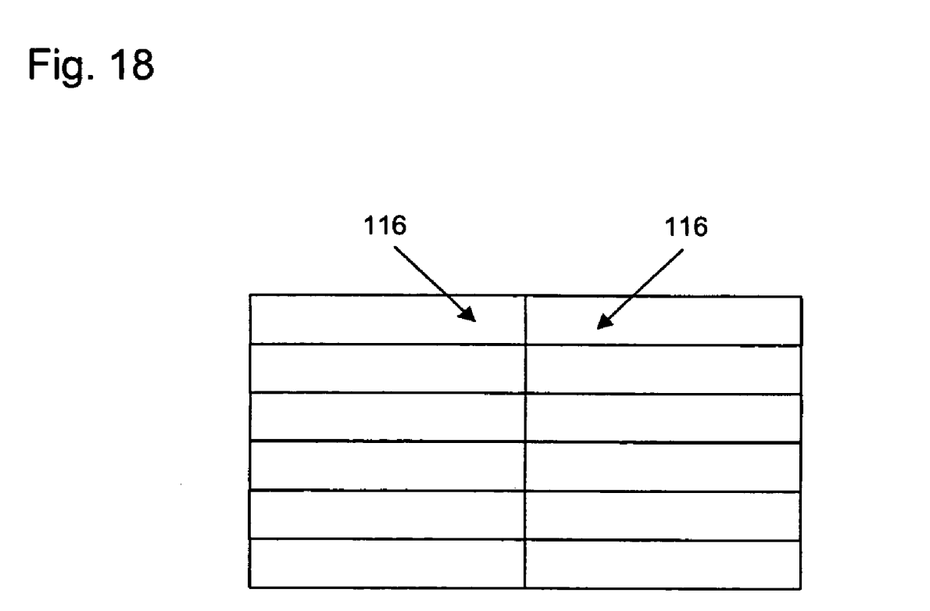
FIG. 18 is an elevation view of the window showing a different partition with the cells.

FIGS. 15-18 show another embodiment of the invention. In this embodiment, the cells are arranged so that part of the periphery of each cell is positioned at the periphery of the window. The wiring for each cell is positioned at the periphery of the window, and thus conductive coating on the shocking absorbing layer is not required. FIG. 15 shows that six horizontal light transmission control cells 112 cover a whole adjustably opaque window 111. FIG. 17 shows that six vertical light transmission control cells 114 cover the whole window. FIG. 18 shows six pairs of horizontal light transmission control cells 116 cover the whole window.

FIG. 16 shows the structure common to the light transmission cells 112, 114, 116. The adjustably opaque window 111 includes an external pane 118 and an internal pane 120. Between the external pane 118 and the internal pane 120, an ultra violet light blocking layer 122, a shock absorbing layer 124, a first polarizing layer 126, the light transmission control cell 112, and a second polarizing layer 127 are positioned in the order according to which they are listed. The light transmission control cell 112 includes a first electrode 128, and a second electrode 130 oppositely positioned with each other. Each of the first and second electrodes 128, 130 includes flexible plastic substrate 132, and a transparent conductive coating 133, which is made of, for example, Indium Tin Oxide, coated on the plastic substrate 132. Between the electrodes 128, 130, liquid crystal 74 is filled. A first polymer layer 134, which is brushed horizontally, is attached to the first electrode 128, and a second polymer layer 136, which is brushed vertically, is attached to the second electrode 130. The spacer 90 with the adhesive layer 96 is positioned between the electrodes 128, 130 and supports them. An adhesive 140 forms a seamless wall between the cells 112. Pressure sensitive adhesive 142 combines the exterior pane 118, the ultra violet light blocking layer 122, the shock absorbing layer 124, the first polarizing layer 126, the light transmission control cell 112, and the second polarizing layer 127.

The panes, layers and cell of this embodiment have constructions similar to those explained with reference to FIG. 4-14.

Light incident on the window 111 is unpolarized. The light is first transmitted through the exterior pane 118, and then through the ultra violet light blocking layer 122, in which the ultra violet light is prevented from further transmitting. Then the light is transmitted through the shock absorbing layer 124, which support and protect the light transmission control cells 112. Then the light transmission control cell 112 together with the polarizing layers 126, 127 control the opacity of the window 111, or transmission ratio of the incident light. Then the light, which is allowed to be transmitted further, is transmitted inside the window through the interior pane 120.

The interval between the external and internal panes 52, 54, can vary between one (1) millimeter and two (2) millimeters.

Figure 19:
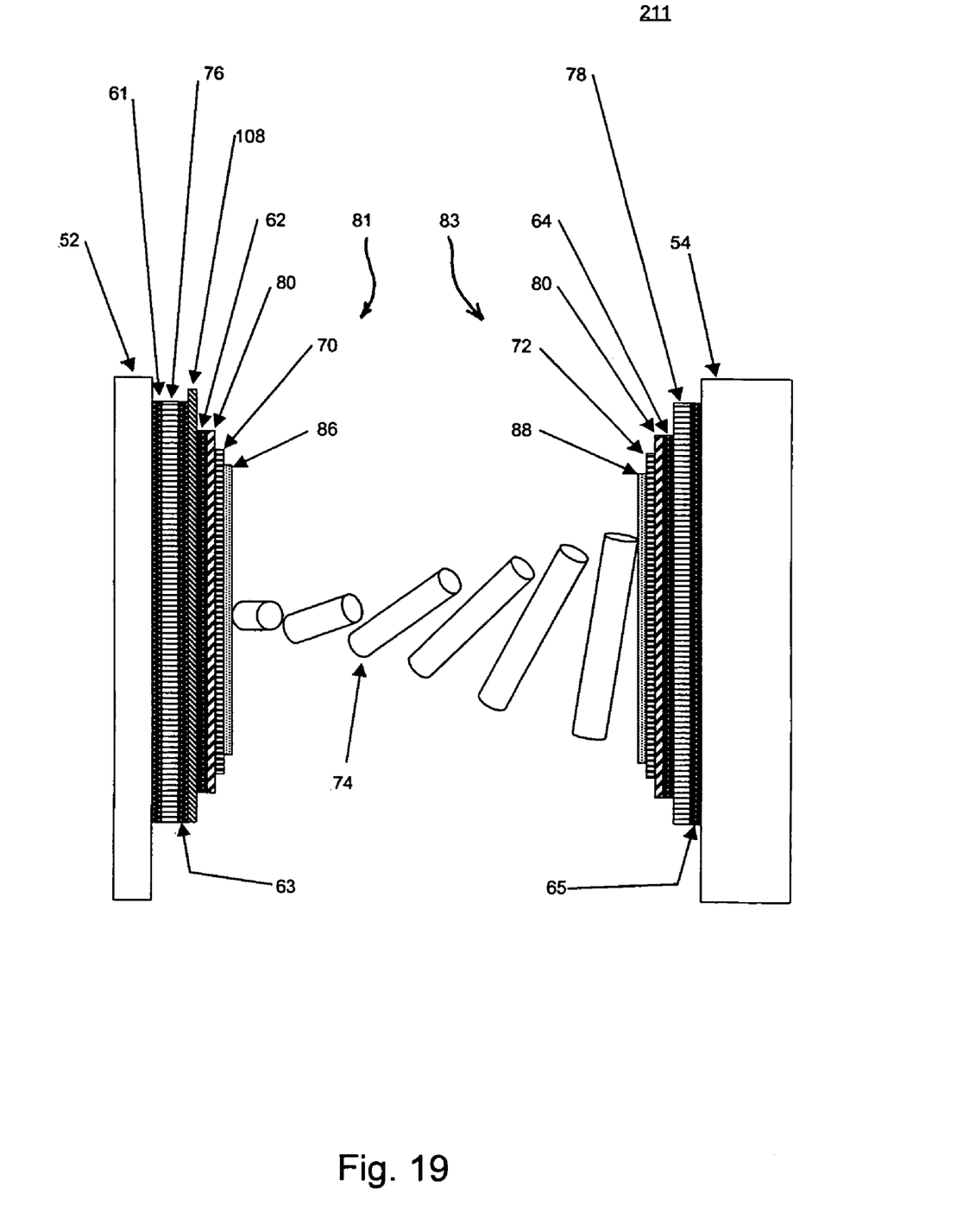
FIG. 19 is a cross-sectional view of the adjustably opaque window.

In another embodiment as shown in FIG. 19, an adjustably opaque window 211 includes a) a light transmission control layer 74, b) first and second electrodes 81, 83 enveloping the light transmission control layer 74, c) first and second inner shock absorbing layers 62, 64 enveloping light transmission control layer 74 and the electrodes 81, 83, d) first and second polarizing layers 76, 78 enveloping the light transmission control layer 74, the electrodes 81, 83, and the inner shock absorbing layers 62, 64, e) first and second outer shock absorbing layers 61, 65, having inner and outer surfaces, enveloping the light transmission control layer 74, the electrodes 81, 83, the inner shock absorbing layers 62, 64, and the polarizing layers 76, 78, f) an external pane 52 disposed on the outer surface of the first outer shock absorbing layer 61, and k) an internal pane 54 disposed on the outer surface of the second outer shock absorbing layer 65.

The adjustably opaque window 211 further includes an ultraviolet light blocking layer 108 and a shock absorbing layer 63 that are positioned between the exterior pane 52 and the light transmission control layer 74.

Each of the electrodes 81, 83 includes a transparent plastic substrate 80, and are coated by a transparent electrically conductive coating 70, 72, preferably Indium Tin Oxide, and are treated with a brushed polymer layer 86, 88.

The interval between the external and internal panes 52, 54 can vary between one (1) millimeter and two (2) millimeters. This reduction in thickness of the opaque window is drastic compared to the prior art considering that it has a plurality of shock absorbing layers and other structure, which is definitely not obvious to the LCD industry.

With the above construction, a stable and robust light transmission layer is achieved using liquid crystals. The liquid crystal cells constructing the light transmission layer are protected from external force by the shock absorbing layer, and also protected from adverse energy such as ultraviolet light or high temperature. When the adjustably opaque window is used in the automotive application, the window may be generally clear, when no electricity is applied, that is, the dormant state; such as when a vehicle is in parked. When a driver gets in the vehicle, the control circuit senses the ambient lighting condition and adjusts the opacity of the window, or the driver may manually adjust the opacity for privacy purposes, etc. Alternately, the vehicle window can be structured to be totally dark and allow no light to enter when it is parked.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An adjustably opaque window comprising:
   a) an external pane;
   b) an internal pane;
   c) an active optical material layer;
   d) a plurality of passive optical material layers; and
   e) a plurality of shock absorbing layers; wherein the external pane and the internal pane provide a cavity between them, wherein the optical material layers and the shock absorbing layers are positioned in the cavity, wherein the optical material layers are sandwiched and supported by the shock absorbing layers, wherein the interval between the external and internal panes can vary between one (1) millimeter and two (2) millimeters.

2. An adjustably opaque window comprising:
   a) a light transmission control layer;
   b) first and second electrodes enveloping the light transmission control layer;
   c) first and second inner shock absorbing layers enveloping light transmission control layer and the electrodes;
   d) first and second polarizing layers enveloping the light transmission control layer, the electrodes, and the inner shock absorbing layers;
   e) first and second outer shock absorbing layers, having inner and outer surfaces, enveloping the light transmission control layer, the electrodes, the inner shock absorbing layers, and the polarizing layers;
   f) an external pane disposed on the outer surface of the first outer shock absorbing layer; and
   g) an internal pane disposed on the outer surface of the second Outer shock absorbing layer.

3. The adjustably opaque window of claim 2, further comprising an ultraviolet light blocking layer and a shock absorbing layer that are positioned between the exterior pane and the light transmission control layer.

4. The adjustably opaque window of claim 2, wherein the interval between the external and internal panes can vary between one (1) millimeter and two (2) millimeters.

* * * * *